(12) United States Patent
Naylor

(10) Patent No.: US 8,316,143 B1
(45) Date of Patent: Nov. 20, 2012

(54) COMMUNICATION INTERFACE BETWEEN GATEWAY MODULES AND INTERNET SERVERS

(75) Inventor: Tom Naylor, San Diego, CA (US)

(73) Assignee: Siemens Industry, Inc., Alpharetta, GA (US)

( * ) Notice: Subject to any disclaimer, the term of this patent is extended or adjusted under 35 U.S.C. 154(b) by 58 days.

(21) Appl. No.: 12/804,168

(22) Filed: Jul. 14, 2010

(51) Int. Cl.
*G06F 15/16* (2006.01)
(52) U.S. Cl. ........ 709/230; 709/202; 709/218; 709/220; 709/227
(58) Field of Classification Search .................. 709/230, 709/202, 218, 220, 227
See application file for complete search history.

(56) References Cited

U.S. PATENT DOCUMENTS

2003/0187920 A1* 10/2003 Redkar .......................... 709/203
2008/0137823 A1* 6/2008 Abichandani et al. ... 379/106.01
2011/0235549 A1* 9/2011 Ahlers et al. .................. 370/255

* cited by examiner

*Primary Examiner* — Lan-Dai T Truong

(57) ABSTRACT

The present invention is used for bi-directional communication between a telemetry gateway module and an internet server system. An agent module may have a first communication port connected to a telemetry gateway module and a second communication port connectable to an internet server system. The agent module may have a set of computer readable software instructions in a computer readable medium to optimize, secure and negotiate communications protocol between the telemetry gateway module and the internet server system.

17 Claims, 1 Drawing Sheet

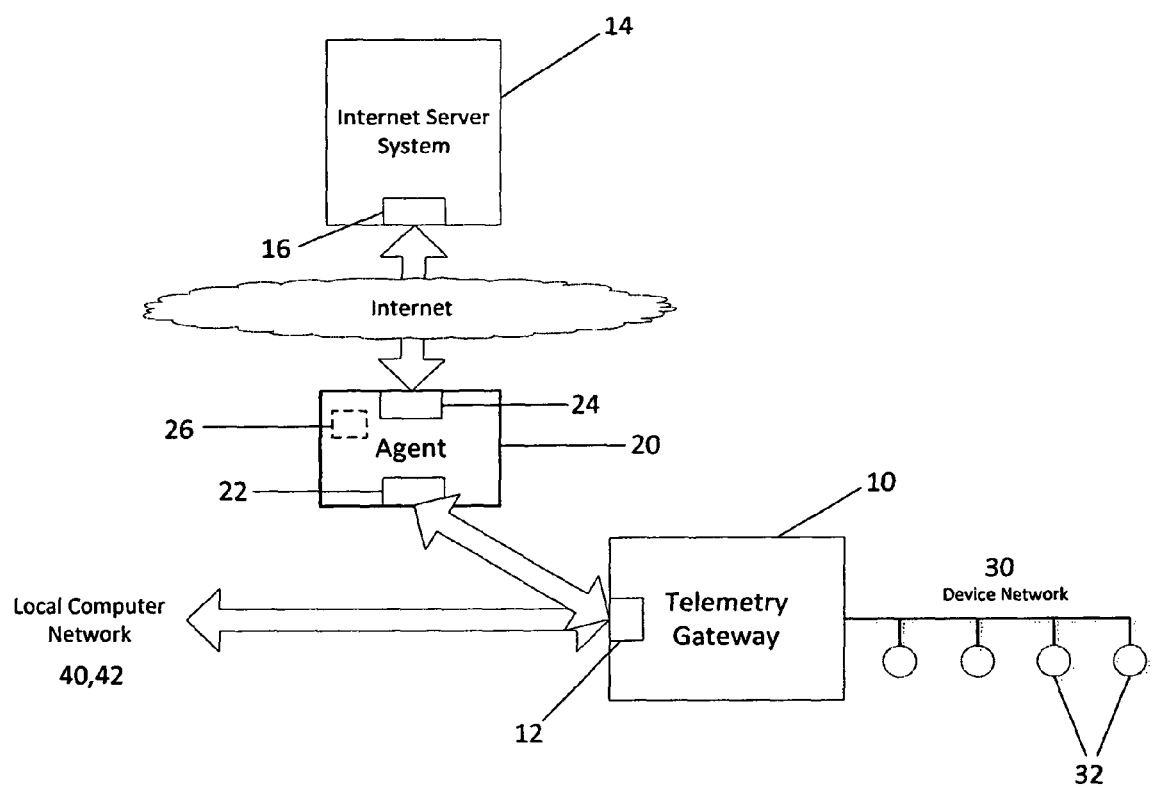

COMMUNICATION INTERFACE BETWEEN GATEWAY MODULES AND INTERNET SERVERS

BACKGROUND OF THE INVENTION

This invention relates to devices and methods for bi-directional communication between a gateway module and an Internet server system. The new interface device decouples an Internet communication system from a gateway module that interfaces a device network and a local area network or computer in order for the interface device to select an efficient communication channel for the gateway module.

Telemetry gateway devices have been commercially available since approximately the late 1990's. A telemetry gateway device may perform the primary function of providing a communications channel between a computer network and an intelligent device network. Intelligent device networks serve the function of providing machine control and monitoring for a variety of applications such as air conditioning, lighting control, pumping systems and many other types of machine control and monitoring functions. Intelligent device networks may rely on protocols and technologies for communication that are not compatible with standard computer networks, hence the need for a telemetry gateway device. Additionally, telemetry gateway devices typically perform master-control functions such as scheduling, conditional logic execution and historical data logging.

In the role of translator between a computer network and a device network, the telemetry gateway may have an interface that is accessible via the computer network. This interface typically allows read/write access to the intelligent device network in such a way that certain details of the intelligent device network protocols and/or communication methodologies are abstracted and simplified. While this network-accessible telemetry gateway interface is useful for software systems residing on the local computer network along with the telemetry gateway, when internet connectivity is required such interfaces may not be accessible due to local computer network security constraints, e.g. firewalls, and other interface issues.

Some telemetry gateway devices attempt to circumvent the local computer network security constraints by implementing a "push" mechanism whereby data updates generated by the device network are delivered outbound to the internet server system, typically using mechanisms such as HTTP. While effective in some circumstances, this approach has very definite limitations in that changes or adaptations to protocols, methodologies or approaches in communications require a modification to the core telemetry gateway software module for the Internet, which will likely compromise or materially alter the functionality of the module.

SUMMARY OF THE INVENTION

The present invention is directed to methods and systems for bi-directional communication between a telemetry gateway module and an internet server system. An agent module may have a first communication port connected to a telemetry gateway module and a second communication port connectable to an internet server system. The agent module may have a set of computer readable software instructions in a computer readable medium to optimize, secure and negotiate communications protocol between the telemetry gateway module and the internet server system.

These and other features, aspects and advantages of the present invention will become better understood with reference to the following drawings, description and claims.

BRIEF DESCRIPTION OF THE DRAWINGS

FIG. 1 illustrates an agent interface device communication between a telemetry gateway and an internet server system according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

An interface device, which may be a software module or hardware module with implementing software, such as an agent 20 module may be introduced into the software operational architecture to separate the concerns of the telemetry gateway device 10 and internet server system 14 communications. The telemetry gateway device 10 may then be free to perform its core, standard functions while offloading the handling of internet server communications to the agent 20. The agent 20 operates to providing seamless, bi-directional communications between internet-based server systems 14 and the local telemetry gateway interface 16.

One of the key benefits to this approach may be that the agent 20 can adapt to changing requirements on the computer network 42 without disrupting or affecting the standard telemetry gateway 10 communication channel. Adaptations by the agent 20 may include changing protocols, communication ports or message security overlays as needed to conform to constraints imposed by the computer network 42 in which the telemetry gateway device 10 is installed, example adaptations may include UDP, TCP, SOAP, XMPP, AIM, HTTP and the like. The agent 20 may receive adaptation instructions from the internet server system 14 as part of an informational exchange or the agent 20 may act independently to adapt to conditions that it discovers during normal operation.

The existence of the agent 20 also allows for a more efficient data transfer methodology since the agent 20 can combine multiple commands and/or information updates into a single message transfer or session. Additionally, the agent 20 can filter and limit certain types of data transfer as requested by the internet server system 14.

Message security may also be implemented by the agent 20, which allows for multiple security implementations and updates without the need to adapt the telemetry gateway 10 communications in any way. This allows for other, typically local, applications to access and utilize the telemetry gateway interface 12 without knowledge or understanding of the security protocols implemented as part of the internet server 14 communications channel. The agent 20 may serve as a proxy function between the telemetry gateway device 10 and the internet server system 14.

The overall benefit of the described technology approach is that the telemetry gateway 10 installation, commissioning and ongoing maintenance is greatly reduced over previous methodologies. This results in lower cost of installation and support. Additionally, resistance from local information technology users to the introduction of a telemetry gateway device 10 on a network infrastructure may be reduced due to the ability of the agent 20 to adapt to existing computer network 42 constraints.

Referring to FIG. 1, the basic elements, connection points and communication channels involved in a system with an agent 20 are disclosed. In structure, the agent 20 software component may be resident as an application running on a telemetry gateway device 10 or as a process running on a separate computing hardware platform.

Upon initialization, the agent 20 may establish a connection with the telemetry gateway interface 12. The connection details associated with this channel may be dependent upon the nature of the telemetry gateway interface 12, but are commonly based upon TCP socket connection technology. This connection, once established, is monitored and maintained by the agent 20. This includes reconnection if necessary. Once this connection is established the agent 20 may then attempt connection with the internet server system 14, which may include attempting multiple channels and protocols in an attempt to negotiate the optimal channel based on the local area network 40 constraints.

After a connection may be established with the internet server system 14 the agent 20 may begin transmission of device network 30 changes and updates to the internet server system 14 as they occur. Additionally, the agent 20 may query the internet server system 14 for any data that requires delivery to the telemetry gateway 10 or its attached device network 30. All received data is transferred in its original format to the telemetry gateway 10. Instructions for the operation and behavior of the agent 20 may also be transmitted by the internet server system 14. These instructions can include constraints on individual device network point updates and limiting or eliminating updates for certain points or classes of points. The agent 20 may monitor changes in the device 32 values as received by the telemetry gateway device 10 and communicate those changes to the internet server system 14 in near real time. The agent 20 may respond to instructions from the internet server system 14 for limiting, delaying or ceasing individual device 32 point update information for the purpose of reducing utilization of network resources.

While the invention has been particularly shown and described with respect to the illustrated embodiments thereof, it will be understood by those skilled in the art that the foregoing and other changes in form and details may be made therein without departing from the spirit and scope of the invention.

I claim:

1. An interface unit for bi-directional communication between a telemetry gateway module and an internet server system comprising:
    a first electronic communication port of an agent module connected to a telemetry gateway module;
    a second electronic communication port of said agent module connectable to an internet server system; and
    a non-transitory computer readable medium of said agent module having a set of computer readable software instructions to optimize, secure, and negotiate communications protocol between said telemetry gateway module and said internet server system, by changing protocols, communication ports, or message security overlays as needed to conform to constraints imposed by a computer network in which the telemetry gateway module is installed.

2. The interface unit as in claim 1 wherein said agent module is a device connectable to a telemetry gateway interface connector and to an interface server interface connector.

3. The interface unit as in claim 1 wherein said agent module is a software program resident on a computer readable medium of said telemetry gateway module.

4. The interface unit as in claim 1 wherein said telemetry gateway moduleis in communication with an intelligent device network and a local area network.

5. The interface unit as in claim 4 wherein said local area network is a computer network.

6. The interface unit as in claim 1 wherein said set of computer readable software instructions receives instructions from said internet server system connected to said agent module for communication with said telemetry gateway module.

7. The interface unit as in claim 6 wherein said set of computer readable software instructions interpret an internet server interface to select an optimum communication channel for communication with said telemetry gateway module.

8. The interface unit as in claim 7 wherein said agent module combines multiple commands and information into a single message transfer between said telemetry gateway module and said internet server system.

9. The interface unit as in claim 7 wherein said agent module filters and limits selected data transfer as instructed by said internet server system.

10. The interface unit as in claim 7 wherein communication security between said telemetry gateway module and said internet server system is controlled by said agent module without modifying said telemetry gateway module.

11. The interface unit as in claim 1 wherein said set of computer readable software instructions interpret protocols, communication ports and message security overlays to configure a communication channel to conform to constraints imposed by said telemetry gateway module as controlled by a computer network.

12. A method implemented by an interface unit for establishing bi-directional communication between a telemetry gateway module and an internet server system comprising:
    connecting an agent module, resided in the interface unit, between the telemetry gateway module and the internet server system through a first electronic communication port and a second electronic communication port;
    establishing, by said agent module, bi-directional communication between the telemetry gateways module and said internet server system; and
    wherein the establishing bi-directional communication including optimizing, securing, and negotiating communications protocol between said telemetry gateway module and said internet server system, by changing protocols, communication ports, or message security overlays as needed to conform to constraints imposed by a computer network in which the telemetry gateway module is installed.

13. The method as in claim 12 further comprising sending device network changes and updates to said internet server system.

14. The method as in claim 12 further comprising receiving data from said internet server system for communication to said telemetry gateway module in the received data original format.

15. The method as in claim 12 further comprising sending instructions for operation of said agent module to said internet server system.

16. The method as in claim 15 further comprising said instructions including constraints for an intelligent device network for constraints for point updates and limiting or modifying updates for selected points and classes of points.

17. The method as in claim 12 further comprising said agent module serving a proxy function between said telemetry gateway module and said internet server system.

* * * * *